June 23, 1953  J. B. BARTOW  2,643,374
SYSTEM OF AERIAL NAVIGATION
Filed Aug. 25, 1950  12 Sheets-Sheet 2

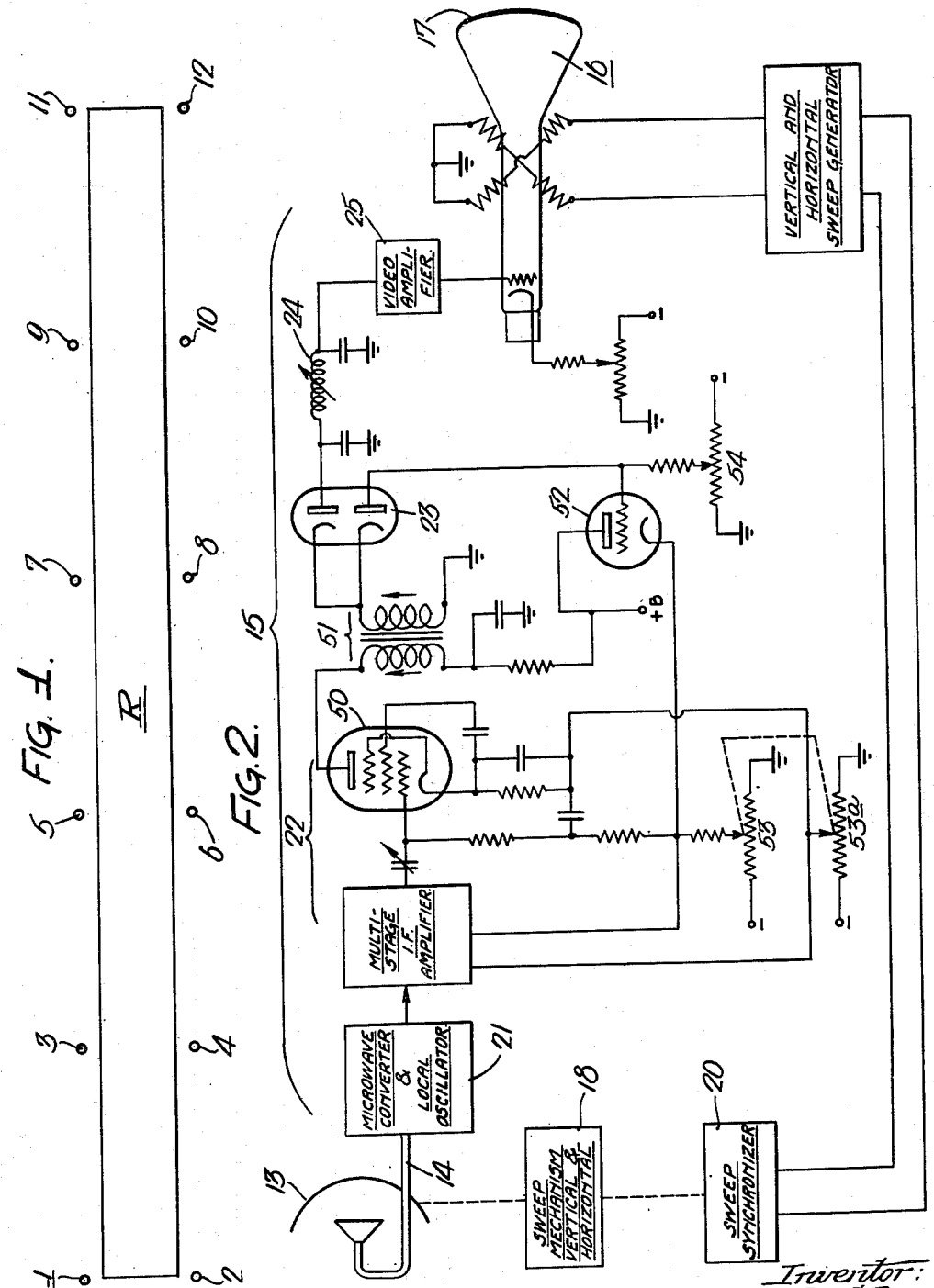

Inventor:
John B. Bartow
by his Attorneys
Howson & Howson

June 23, 1953 J. B. BARTOW 2,643,374
SYSTEM OF AERIAL NAVIGATION
Filed Aug. 25, 1950 12 Sheets-Sheet 3
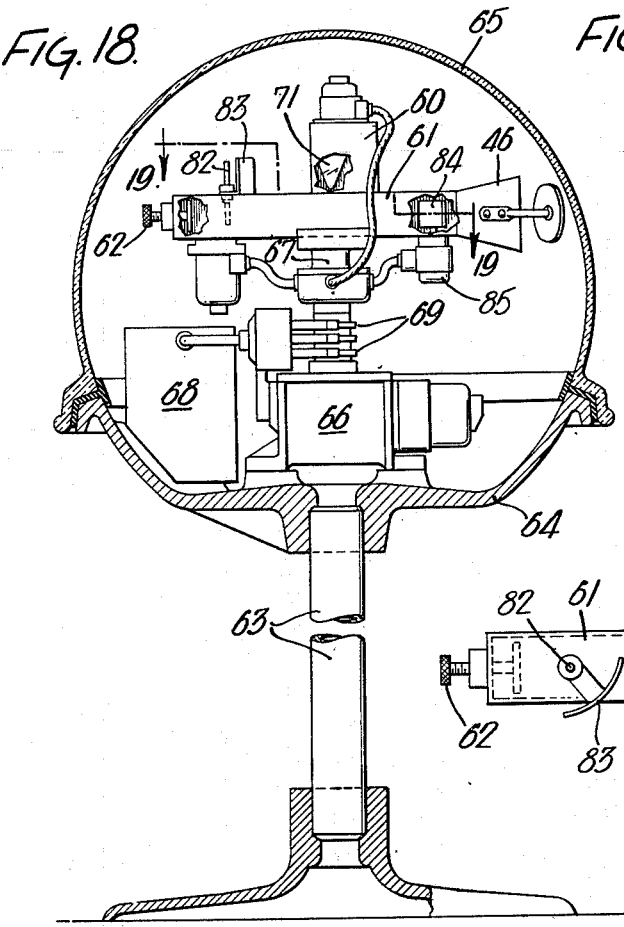
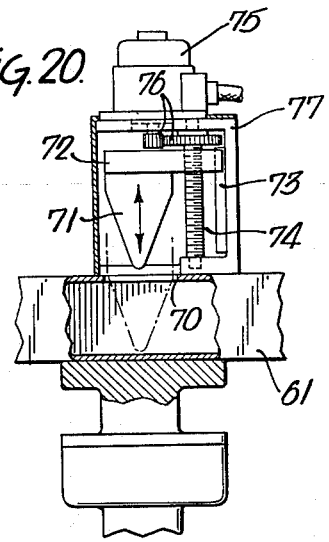
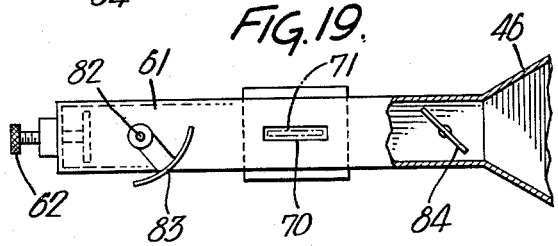
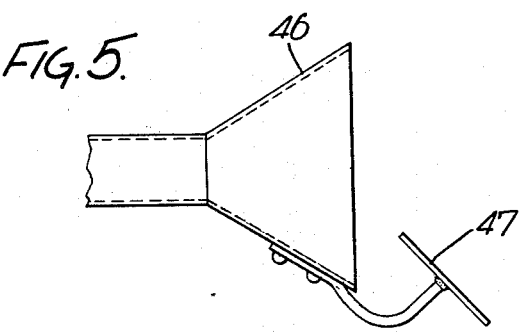
Inventor:
John B. Bartow
by his Attorneys
Howson & Howson Inventor:
John B. Bartow
by his Attorneys
Howson & Howson June 23, 1953  J. B. BARTOW  2,643,374
SYSTEM OF AERIAL NAVIGATION
Filed Aug. 25, 1950  12 Sheets-Sheet 5

June 23, 1953    J. B. BARTOW    2,643,374
SYSTEM OF AERIAL NAVIGATION
Filed Aug. 25, 1950    12 Sheets-Sheet 6

June 23, 1953 J. B. BARTOW 2,643,374
SYSTEM OF AERIAL NAVIGATION
Filed Aug. 25, 1950 12 Sheets-Sheet 12

Inventor:
John B. Bartow
by his Attorneys
Howson & Howson

Patented June 23, 1953

2,643,374

UNITED STATES PATENT OFFICE 2,643,374

SYSTEM OF AERIAL NAVIGATION

John B. Bartow, Blue Bell, Pa., assignor to Bartow Beacons Inc., Blue Bell, Pa., a corporation of Pennsylvania Application August 25, 1950, Serial No. 181,459

12 Claims. (Cl. 343—108)

This invention relates to a system of aerial navigation in which the positions of marker beacons radiating invisible energy are made visible to the pilot of an aircraft under atmospheric conditions which prohibit direct visual observation of the ground or of artificial light sources.

The invention is particularly concerned with such a system in which the radiation patterns of the beacons are controlled so as to make possible the use of very short wave lengths and thus make possible the use of equipment of size and weight compatible with the requirements of an aerial navigation system. The invention further adapts the system for use under different atmospheric conditions.

The invention is accordingly described herein as embodied in a marker beacon installation characterized by the combination of generators of invisible radiant energy whose output is of a specified order of wave length with energy radiators whose directional characteristics are such as to produce a specified radiation pattern. A plurality of such generator-radiator combinations are combined to produce a collective pattern which may be sensed by airborne receiving equipment of small dimensions, at relatively great distances, and which delivers to the aircraft crew a large amount of information in instinctively assimilable form.

This application is a continuation-in-part of my copending application Serial No. 705,538, filed October 25, 1946, now abandoned, which discloses a system especially adapted to facilitating the approach and landing of aircraft under conditions of poor visibility.

At the present time aircraft flight schedules are very much dependent upon weather conditions, especially at the destination or landing airfield. With present aircraft and navigational aides, safe flying is possible under conditions that would have been extremely hazardous a few years ago. Taking off under conditions of extremely low visibility or so-called zero/zero conditions is not difficult for experienced pilots using adequate equipment. Radio navigation aides have been developed so that the location of the landing field is not difficult even when flying through fog, rain or snow over extremely long ranges. However, the approach and landing procedures are still very experimental and hazardous unless some visual contact with the landing strip is obtained before actual contact with the ground is made.

Two typical systems in existence are the I. L. S. (Instrument Landing System) and G. C. A. (Ground Controlled Approach). These systems should more properly be called approach systems, as they have accuracy limitations and require some visual contact with the ground before landing under actual, not merely simulated, conditions. Neither system should be depended upon below altitudes of from 50–100 feet.

I. L. S. is subject to course bending and is extremely sensitive to variations in the antenna system installed in the aircraft, as well as to interference caused by any object passing through the radiation patterns of the guide paths. Actually, the I. L. S. system is subject to other difficulties among which are the obvious ones of requiring considerable pilot training, presentation of information in unfamiliar form (two crossed pointers in an electrical instrument) requiring interpretation by the pilot with resultant slower response, and coordination of the I. L. S. equipment with the normal blind flying instruments.

G. C. A. is subject primarily to errors caused by the differences in reflection patterns from different aircraft. These reflections can cause errors in location of as much as 100 feet, and G. C. A. should not be relied upon for actual landing as errors of much less magnitude can be dangerous.

Another difficulty with G. C. A. is an economic one, as it requires very expensive equipment plus a crew of men to operate it and relay the information to the landing aircraft. Many pilots do not care for the system, as it requires the pilot to put complete trust in the G. C. A. crew regardless of the experience of the pilot. This system, however, has up to the present proved to be one of the most satisfactory of any yet tried for traffic control and piloting. The G. C. A. system also requires interpretation of a cathode ray tube pattern by trained ground crews (so it is only as good as the judgment or skill of the operators), the transmission of verbal directions to the pilot, and the interpretation of the directions and resultant action by the pilot, along with coordination with other blind flying instruments. Again the time necessary for response of the pilot is longer than is safe, especially during the last stage of the landing operation when very little time is available for the correction of mistakes.

The landing speeds of present day and proposed high speed aircraft demand a system that is capable of as rapid interpretation as actual visual contact landing procedure. Instruments are still useful in guiding the pilot toward the landing approach area, from which the landing is to be made, since in this application the pilot as time to interpret the readings and act upon them. Once the pilot has reached the approach area, however, he must have sufficient natural reference to the landing runway to assure a safe landing.

The combination of either G. C. A. or I. L. S. and a visual landing system employing optical beacons, as described in U. S. Patent No. 2,155,295, has so far proven to be the best combination of all the systems yet tried, permitting landing under conditions that would have been otherwise impossible. The practical limit of optical beacons, however, has nearly been reached, as the penetration, obeying an exponential law, is but slightly increased with greatly increased power. The present standard unit has candle power intensities of over 200,000, but even with this intensity there is insufficient penetration of heavy fog or snow during daylight for landing high speed aircraft. Further development of optical beacons is impractical, as increase in the candle power a thousand fold would increase the effective range only slightly, as can be seen by applying Allard's Law.

Referring more particularly to the above-mentioned patent, the system disclosed therein affords the necessary visual contact under conditions of such poor visibility that the pilot is unable to see the landing runway. That system provides a pair of parallel and level rows of light projectors on opposite sides of the runway, which projectors are so spaced and have such light distribution characteristics that they may have extremely high candle power and are visible to the pilot without glare even under adverse weather or atmospheric conditions. The two parallel rows of light sources, being visible to the pilot as clearly defined rows of spots, give the necessary visual perspective to establish a level plane for visual or so-called contact landing. By reason of such perspective, he is apprised of the direction, speed, altitude and attitude of the aircraft with respect to the runway at each instant during the landing, as long as the penetration is above the useful limit, without reference to other kind flying instruments. It should be noted further that it is not necessary for the pilot to see the rows of parallel light sources in their entirety as long as he sees parallel portions of the two rows at each instant during the landing operation. The use of controlled pattern optical beacons permits the visibility range to be increased approximately three times at night and doubles the day range as compared with uncontrolled beacons of the same candle power. But under conditions of extremely poor visibility, with the future faster landing speeds and with larger and blinder pilot cabins, this is insufficient for safe landing operation of aircraft.

It is more informative in speaking of high landing speeds to indicate the forward visibility in terms of the number of seconds it would take to cover the distance. For example, if the pilot's visibility is 1/16 mile, the visibility range is approximately 330 feet. If the aircraft is approaching and landing at a speed of 100 miles an hour, it is moving in excess of 145 feet per second, and a distance of 330 feet would be covered in a little over 2 seconds. Even when using controlled pattern visual beacons, the system will only provide somewhat more than 4 seconds forward visibility in day light and about 6 seconds at night. This time is insufficient for safe landing operations, and if landing speeds were still further increased, it would make landing operations extremely hazardous. In fact, due to obstructions and blindness of pilot's cabins in some present large transports, it is impossible for the pilot to see the ground up to 650 feet ahead of the aircraft, i. e. approximately 4 seconds ahead of the aircraft, from 100 feet altitude, and therefore he cannot see any of the lights during such day time visibility and he can see only a few of them at night, although correctly lined up with runway. Much worse visibility is sometimes encountered, especially during snow storms. The visibility range of optical beacons can be reduced so much by snow, especially driving or drifting snow, that it is dangerous to land any high speed aircraft. This is especially true in the day time because of the high foreground illumination.

It is thus apparent that the limiting factor in controlled pattern optical systems is the range of penetration which, as pointed out above, is equivalent to about 4 seconds during daylight and about 6 seconds during night, based upon a landing speed of about 100 miles an hour.

It is possible to increase the penetration by employing beacons radiating invisible energy and by providing in the aircraft a radio receiver responsive to such radiant energy, together with equipment such as a cathode ray tube for visually indicating the positions of the marker beacons. However, prior to the present invention such a system was impractical and useless. If the radiated invisible energy is of relatively long wave length so as not to be reflected or diffused by particles liable to be in the atmosphere during poor visibility conditions, the size and weight of the equipment are intolerable for aerial navigation. Thus the size of a receiving antenna must be increased in direct proportion to increase of wave length. If the wave length of the radiated invisible energy is made short enough to reduce the size and weight of equipment to within tolerable limits, the problem of "scattering" arises. Scattering is the effect produced by reflection of the radiated energy by particles of moisture or snow in the atmosphere. At the wave lengths required for tolerable size and weight of equipment such reflection takes place and causes interference between the signals from the ground beacons. This will be described more fully later.

Another problem in such a system arises from the fact that atmospheric conditions vary greatly and affect transmission, and this militates against visual reproduction of the ground beacons as clearly and distinctly defined spots on the screen of a cathode ray tube.

According to the present invention the aforementioned problems are overcome by utilizing a wave length of the radiated invisible energy of the order of magnitude affected by particles in the atmosphere, and by so controlling the radiation patterns of the beacons as to establish substantially uniform field strength of the radiated energy along the flight path whereby all of the beacons are visually reproduced on the viewing screen at the receiver as clearly defined spots of even intensity. The invention further provides for adjustment of the angularity and intensity of the radiated beams to compensate for different atmospheric conditions.

At the wave length employed, the size and weight of the receiving equipment is compatible with the requirements of airborne operation, and while such a wave length will give rise to scattering, the effects thereof are effectively nullified by reason of the controlled radiation of the beacons.

The reduction in size of transmitting and receiving antennas effected by decreasing the wave length is numerically equal to the ratio between the lowest wave length which is acceptably free from scattering when the radiation pattern is uncontrolled and the wave length at which the limiting factor is the penetrating power of the radiation in question. In practice the shortest wave length which will permit reception at a distance of two miles during a snow storm, which could have an attenuation of 40 db per 5000 feet, is .1 cm., while acceptable freedom from scattering where using uncontrolled radiation cannot be obtained below a wave length of about 10 cm. A contribution of controlled radiation to an invisible wave system, therefore, is a reduction in the size and weight of the equipment which is roughly proportional to the ratio between these two wave lengths, i. e., 100 to 1. Thus, with a wave length of .1 cm. a 10″ reflector will give the same definition as will a 1000″ reflector with a wave length of 10 cm.

It is a general object of the present invention to provide an aerial navigation system in which the positions of radio marker beacons are made visible to the pilot of an aircraft at a distance from the beacons much greater than the maximum range of optical beacon systems, in which system the beacons radiate energy whose wave length is of the order of magnitude affected by particles in the atmosphere, and in which such energy is radiated from each beacon in a controlled radiation pattern giving substantially uniform field strength along a vertical plane containing the flight path, whereby the apparent signal strength of a plurality of beacons is substantially the same at all points in said plane.

It is a further object of the present invention to provide an array of microwave marker beacons whose relative positions are such as to constitute a pattern conveying accurate information to an aircraft pilot as to the attitude and position of his aircraft relative to the flight path.

It is a further object of the invention to provide a system comprising marker beacons radiating invisible energy in controlled radiation patterns such that the ratio of the maximum to minimum signal strengths is within the tolerance of the receiving equipment employed.

A still further object of the invention is to provide a system of marker beacons radiating invisible energy at a wave length normally subject to prohibitive interference by suspended particles in the atmosphere, and in a pattern which overcomes the effect of interference so that the location of individual beacons can be determined regardless of the interfering effect of such particles.

Still another object of the invention is to provide such a system wherein the beacons are adjustable both as to position and intensity of the beams to meet changing atmospheric conditions, so as to maintain substantially equal apparent field strengths from the several beacons in the plane of the flight path, despite variations in the transmission characteristics of the atmosphere.

How the foregoing and other objects are obtained will appear more fully from the following detailed description with reference to the accompanying drawings in which Fig. 1 is a schematic layout or plan view of a runway and the associated beacons;

Fig. 2 is a diagrammatic illustration of the receiving apparatus provided on the aircraft;

Fig. 5 is a plan view of a radiating horn which may be used at each beacon;

Fig. 18 is an elevational sectional view of beacon which may be used in accordance with the practice of the invention;

Fig. 19 is a view taken along line 19—19 of Fig. 18;

Fig. 20 is a fragmentary sectional view showing the intensity varying mechanism;

Figure 3:
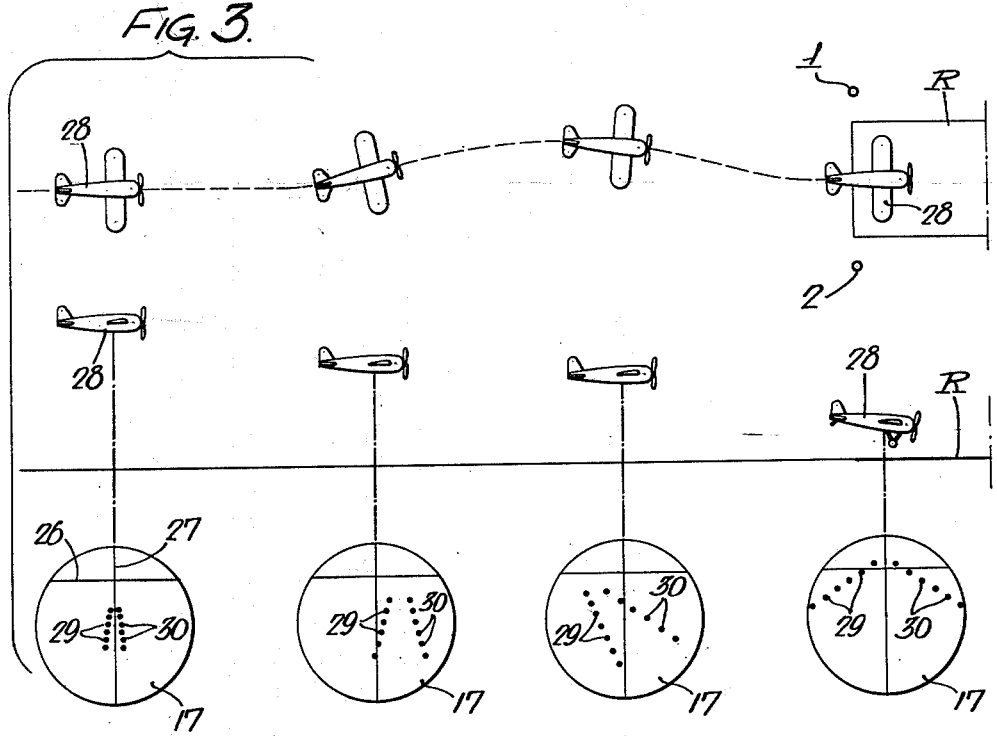
Fig. 3 is an illustration of the manner in which the aircraft pilot is given a visual perspective reproduction of the two parallel rows of beacon

Referring more particularly to the drawing in Fig. 1, an aircraft landing runway is represented at R, and on opposite sides of the runway there are provided two parallel rows of microwave transmitter units or beacons according the present invention, represented by small circles. For convenience of illustration, each row is shown as comprising six beacons although will be understood that this is merely an arbitrarily chosen number. The beacons are individually designated by reference numerals 1 to 12, respectively, with odd numbered beacons on one side of the runway and even numbered beacons on the other side of the runway. It may be assumed that the direction of approach of an aircraft is from the left as viewed in Fig. beacons 1 and 2 being the first ones in the direction of approach of the aircraft.

As above mentioned and as hereinafter more fully described, each of the beacons is adapted to provide a directional radiation pattern, and each beacon has provision for varying both the intensity and angularity of the beamed energy according to different conditions of atmospheric transmission. As described hereinafter, each beacon may comprise a microwave oscillator and a directional radiator or antenna.

By way of example, the two rows of beacons may be 400 feet apart, and the spacing of the beacons in each row may be 1000 feet. The beacons should be at the same level in relation to the runway to assure true visual perspective when depicted on a cathode ray tube screen, as hereinafter pointed out.

Fig. 2 illustrates diagrammatically the receiver apparatus which is provided on the aircraft. For the most part, such apparatus is conventional, being of the type which has been employed in the past in radio beacon systems and the like. However, as hereinafter described, the receiver equipped with an AVC (automatic volume control) system which is especially adapted for the particular purpose to which the receiver is applied in this instance. For the present, it suffices to note that the receiver comprises a scanning antenna 13 which may feed received signals through a wave guide 14 to the receiver proper designated generally by reference character 15, which, 1

1, supplies signals to the control grid of a 1ode ray tube 16 having a viewing screen 17. antenna 13 is actuated by the sweep mechsm 18, and at the same time the electron beam he cathode ray tube 16 is given a scanning moby deflecting signals supplied from the sweep erator 19. The latter is controlled by the ep synchronizer 20 which is mechanically coul to the sweep mechanism of the antenna.

s regards the receiver proper, it suffices to at this time that it may comprise a micro- e converter and local oscillator stage 21, a ti-stage I. F. amplifier 22, a detector 23, an ". filter 24 and a video amplifier 25. The AVC em of the receiver will be discussed later.

he antenna 13 is arranged on the aircraft so o sweep over or scan an area forward of the raft comparable to the area normally observed in aircraft pilot during landing. It is essenthat the antenna shall receive the trans- :ed waves from the beacons of Fig. 1 ahead he airplane during the entire landing opera- , i. e., from the time the aircraft pilot reaches landing approach area until the aircraft ls on the runway. Therefore, the area ined by the antenna should be sufficient to )mplish this objective. It is also essential that antenna be highly directional so that it is pted for element-by-element scanning of the ling area in the same way that the electron n of the oscilloscope 16 scans the screen there-The scanning motions of the antenna and he oscilloscope electron beam may be of the -by-line and frame-by-frame variety. As itioned above, receivers of this character are known.

he signals received by the antenna from the und beacons—as the antenna scans the landarea—are translated by the receiver apparaof Fig. 2 into observable spots on the viewing en of the oscilloscope 16. In other words, two parallel rows of beacons shown in Fig. 1 visually reproduced as observable spots on oscilloscope screen. Moreover, this visual reluction of the beacons is an accurate repreation of the two rows of beacons, and it truly ilates the direct viewing of two rows of ground cts by the aircraft pilot. Thus, as the pilot s the reproduction on the oscilloscope screen, the same as though he were seeing two par- rows of ground objects directly. This gives visual perspective, which is necessary to proinstinctive assimilation of a large amount of rmation in a very short time.

ne foregoing may be more clearly understood i the aid of Fig. 3 to which reference is now .e. At the lower part of this figure, there four representations of the oscilloscope screen hich is provided with two fixed reference lines nd 27 arranged at right angles to one another. ve the aforesaid representations are elevaal and plan representations of an aircraft rith respect to the runway R. It may be ased that the aircraft 28 is approaching the vay for a landing and that it assumes the essive positions illustrated during its ap- .ch.

the left-most position, the aircraft is level t relatively high altitude and is properly ted with the runway. These facts are indid to the pilot instinctively, due to the pertive sense, by the left-most oscilloscope reptation, wherein the two rows of spots are to one another and are only slightly tapered, ymmetrical with respect to the reference line 27 which represents the longitudinal axis of the aircraft, and converge toward a point on reference line 26 which represents the horizon when the aircraft is level. Moreover, the pilot is also apprised of the fact that the aircraft is some distance from the runway since the spots 29 and 30 form a true perspective which is the basis of all contact approaches.

In the next position of the aircraft, it is out of alignment with the runway but is closer thereto and is level at lower altitude. Hence the spots 29 and 30 appear as in the second illustration of the oscilloscope screen, converging toward a point on line 26.

In the third position, the aircraft is still out of alignment with the runway and this is indicated by the spots 29 and 30 which appear as in the third illustration of the oscilloscope screen.

In the fourth and last position, the aircraft 28 is again aligned with the runway and is declined towards the runway at low altitude directly above the end of the runway. Hence the spots 29 and 30 are widely divergent and are symmetrically arranged with respect to the reference line 27, and they converge toward a point above line 26, giving to the pilot the same information that he normally uses to land the aircraft.

Thus, as illustrated in Fig. 3, the pilot's observation of the oscilloscope screen is the same as though he were observing directly two parallel and level rows of objects located substantially at ground level. Consequently, the pilot is given the same visual perspective as though he were directly observing such objects.

It is important that the representations of the beacons appear on the oscilloscope screen as well defined spots in order that the pilot will be given a sharply defined visual perspective of the two rows of beacons. For this reason, the light spots on the oscilloscope screen should appear with substantially equal intensity of brightness and without any clutter, blur, haze or halo.

In accordance with the present invention, this end is accomplished, despite the use of a very short wave length, by effecting controlled radiation of the beams projected by the beacons. In order to accomplish the desired result, it is necssary, first that the radiation patterns of the beam be such that the intensities of the signals from the various beacons are substantially equal at any point in a vertical plane extending centrally of the landing runway and, second, that the radiation pattern be adjustable as to position and intensity according to atmospheric conditions.

To develop a vertical plane of substantially uniform field strength down the center of the runway requires that the radiation pattern from each beacon be so formed that as the aircraft progresses down the central plane of the runway the signal strength from each beacon remains substantially the same. The directed radiation from each beacon drops off in direct relation to the approach of the aircraft, compensating for the decreased distance of the aircraft, so that the resultant received signal strength from any one beacon is the same regardless of the position of the aircraft anywhere along the central plane of the runway while approaching between the beacons.

It should be noted that it is not necessary for the received signal strength to be held to extremely close limits, as the AVC circuit of the receiver serves to compensate for small variations in received signal strength. However, if the beacons were not designed for substantially uniform signal strength along the central plane of the runway, variations of more than 1,000,000/1 would be encountered which would be far beyond the compensating ability of the receiver circuits. And if such compensation were attempted, the interfering signals due to scattering would be increased so that no clear definite signals could be seen as they would be completely obscured by the greatly amplified background signals and noise.

Figure 4:
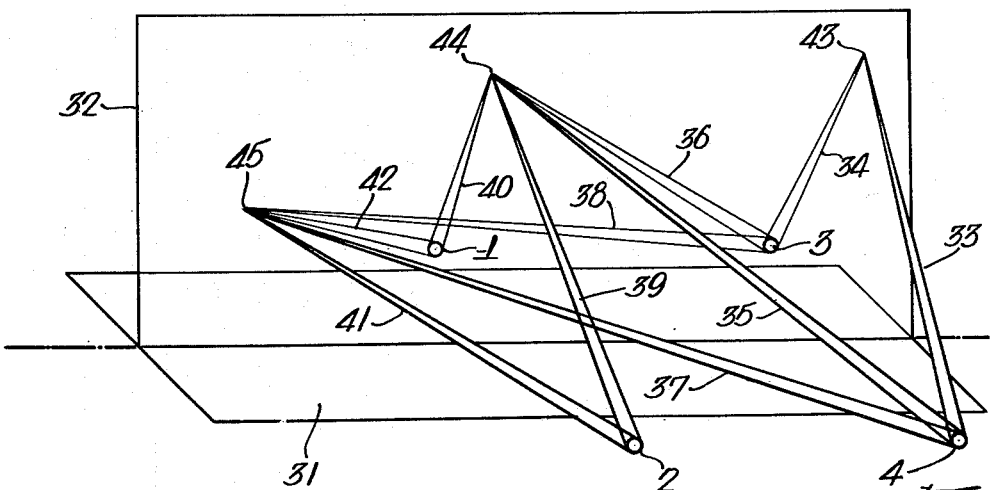
Fig. 4 is an explanatory illustration of the relationship between the beacons and the vertical plane containing a flight path.

Fig. 4 is a simplified representation of the combined radiation of two pairs of beacons showing the development of a plane of uniform field strength coinciding with the central approach plane.

In Fig. 4, 31 is a portion of the runway, while 32 is a portion of the imaginary central vertical approach plane. The tapered elements numbered 33 to 42 represent aribtrarily chosen portions of the radiated energy. At the source (beacon) these elements are of different radiation intensities which are determined by the controlled radiation pattern. The radiation intensity decreases with distance from the beacon due to atmospheric attenuation loss and radiation loss.

The radiation pattern of each beacon is designed so that all portions of the radiated field that intersect the central vertical approach plane are of equal field strength at the plane regardless of the distance (within the usable range) the various portions have to travel. This is accomplished by providing greater radiated energy in the direction of greatest radiation travel; i. e., at the smallest angles of separation from the plane 32.

In Fig. 4 the field intensities from the various beacons 1, 2 and 3, 4 are substantially equal at the arbitrarily chosen points 43, 44 and 45 of the plane of equal field strength.

The required radiation pattern can readily be obtained by utilizing known devices and techniques. It should be noted that the use of a small wave length enables a greater degree of control of the radiation pattern. In the preferred embodiment described herein, the signal radiation may be effected by horn radiators, parabolic reflectors, and other devices which are known to be capable of use at the frequencies contemplated. By way of example, each of the runway beacons may utilize a horn-type radiator, as shown at 46 in Fig. 5, constructed or modified to give the desired radiation pattern. Horn-type radiators are well known, but as commonly constructed and used they have a symmetrical radiation pattern. In order to produce the asymmetrical pattern for use in the system provided by the present invention, an ordinary horn may be modified, as shown in Fig. 5, by providing a reflecting surface 47 adapted and arranged to effect the desired modification of the radiation pattern.

Figure 6:
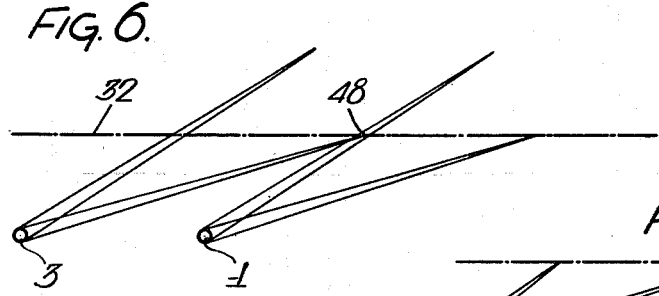
Figs. 6 to 8 are explanatory illustrations.
Figure 7:
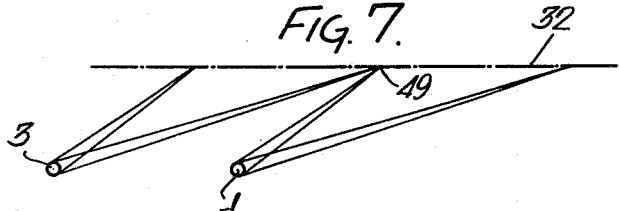

Control of the radiated field pattern, as above described, is necessary in order that there will be no overloading of the aircraft receiver and in order that there will be no appreciable interference or clutter by atmospheric particles such as snowflakes, raindrops, etc. The necessity for controlling the radiation from the standpoint of receiver blocking is demonstrated by the simple illustrations of Figs. 6 and 7. In these figures, portions of the radiation from two successive beacons 1 and 3 are shown with respect to the central plane 32. In Fig. 6, the radiation is uncontrolled and radiating symmetrically at all angles and at point 48, the received signal strength from beacon 1 would so greatly reduce the receiver sensitivity, that the signal from beacon 3 would not be received or detected even though the antenna is directed at beacon 3. Fig. 7 shows the same condition with properly controlled radiation. At any point 49, the received signals have substantially equal intensity and therefore the receiver responds only to the beacon at which the antenna is directed.

As previously mentioned, the receiver is provided with an AVC system which is especially adapted for the present purpose. A suitable system is shown in the receiver illustration of Fig. 2. The proper design of the AVC system is of paramount importance; because, if too much AVC were used, the definition of the entire landing area would be deleteriously affected. The definition furnished by the receiving system depends upon the narrowness of the antenna pattern, and if too much AVC were used, the antenna pattern would become wider as the receiver gain increased to offset the decrease in signal strength when the antenna passes over and beyond a radiating source. Consequently, the effect would be the same as if no AVC were used and as if a broad antenna were used. The AVC circuit illustrated in Fig. 2 is somewhat unconventional, as it permits control of the degree of AVC as well as the threshold of operation.

Referring again to Fig. 2, the output tube 50 of the I. F. amplifier 22 is coupled by the interstage transformer 51 to the cathodes of the detector 23 which may be of the 6H6 type and which develops an AVC voltage to control the gain of the receiver. The operation of the AVC circuit may be readily understood by assuming an increase in received signal strength producing an increase in the negative voltage applied to the control grid of the AVC control tube 52. The increased negative voltage reduces the plate current through tube 52 and causes the cathode thereof to become more negative. The resulting negative signal is applied to the control grids of the I. F. amplifier tubes and reduces the amplifier gain to partially compensate for the increase in signal strength. The degree of compensation is controlled by the potentiometer 53, which controls the negative voltage applied to the cathode of tube 52. The greater the magnitude of such negative voltage, the greater will be the degree of compensation. To avoid any effect on receiver gain with adjustment of potentiometer 53, a compensating potentiometer 53a is employed, ganged to potentiometer 53, which introduces a compensating voltage to prevent any increase or decrease in receiver gain when the degree of AVC compensation is varied. The point at which the AVC starts is determined by the potentiometer 54 which applies negative grid bias to the AVC control tube 52. When the received signal exceeds the negative voltage on the plate of the lower diode of tube 23, rectification takes place and the AVC circuit functions as above described to decrease the gain of the receiver.

Figure 8:
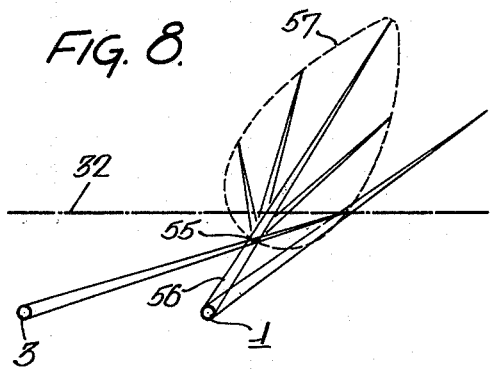
Figure 9:
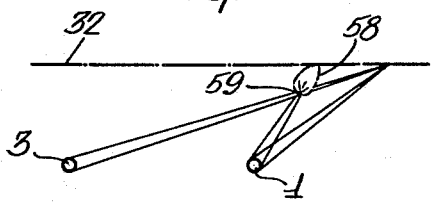
Figure 22:
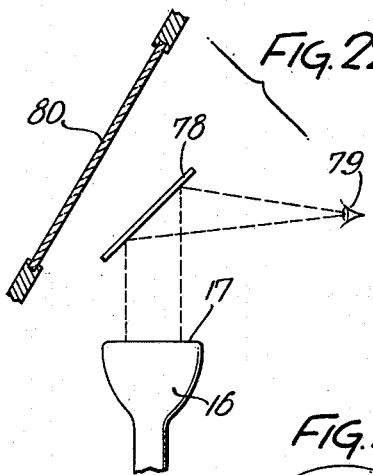
Fig. 22 is a view taken along line 22—22 of Fig. 21.

Figs. 8 and 9 serve to demonstrate why controlled radiation is necessary to prevent interference by atmospheric particles such as snowflakes and raindrops. Here again, tapered elements are utilized to represent portions of the direct or primary radiation from two successive beacons. In the case of Fig. 8, the radiation is not controlled according to the invention but is radiating equally in all directions and it may be seen from the illustration that an atmospheric article, such as a snowflake, located at 55 may interfere with the operation of the system. Due to the high intensity radiation of the beam element 56 at 55 from beacon 1, substantial scattering may be produced by the said particle because of reflection and refraction, as represented 57. As previously mentioned, scattering occurs at the short wave length employed, due to the fact that the wave length approaches or is comparable to dimensions of snow flakes and large rain drops. As may be seen in Fig. 8, the scattering effect produced by an atmospheric article at 55 from radiation from beacon 1 may blank out the direct radiation from the succeeding beacon 3 which has a weaker signal at 55 due to distance. On the other hand, with controlled radiation according to this invention, as shown in Fig. 9, any scattering effect 58 produced by an atmospheric particle at 59 on radiation from beacon 1 will not cause appreciable interference with the radiation from beacon 3, as the scattering effect will be below the level of response of the receiver at any point in plane 32 the direct radiation from each beacon. This is due to the fact that the radiation intensity from beacon 1 is not sufficiently strong at point to produce scattering of sufficient intensity to reach plane 32 with enough strength to cause interference. Thus, while wave lengths of the order here used may not be employed with uncontrolled radiation pattern, control of the radiation pattern makes such wave lengths available.

The effect of scattering and the overcoming thereof by the present invention may be better understood from the following further explanation. For proper operation of the system, the aircraft receiver should clearly "see" each beacon as the receiver antenna scans across the beacon. When substantial scattering takes place, as shown in Fig. 8, the receiver is effectively "blinded" and unable to "see" the beacon at which it is "looking" through its antenna. Thus in Fig. 8, the receiver, "looking" at beacon 3, could not "see" that beacon because of the greater intensity, in the flight plane 32, of the scattered energy that came from beacon 1. When it is considered that there will be many such scatterings, with each offending particle in the atmosphere itself becoming in effect a strong secondary radiation source, it is apparent that the receiver screen will be cluttered to the extent of rendering the system useless. However, as shown in Fig. 9, the present invention effectively reduces or limits the scattering so that the strength, in the flight plane, of the scattered energy is below the field strength therein of direct energy from each beacon. Hence the scattering is unable to "blind" the receiver, and the receiver is able to "see" each beacon.

The utilization of controlled microwave radiation, according to the present invention, gives ample penetration to meet the needs for "contact landing" at very high speeds. However, increased penetration is not in itself sufficient to provide a practical operating system. It is necessary to provide proper radiation of the microwave beams above described for varying conditions, and in order to do so it is necessary to provide for control of intensity and angularity of the beams in relation to atmospheric attenuation. Since penetration varies according to atmospheric attenuation, under severe atmospheric attenuation conditions due to many large particles in the atmosphere, the field strength pattern of the beams may change in such a way as to alter the field strength radiation pattern enough to render the system inoperative.

The plotted graphs of Figs. 10 to 17 show typical radiation patterns and also show why it is necessary to provide for control of intensity and angularity of the beams. Of necessity, different scales are employed in the graphs.

Figure 10:
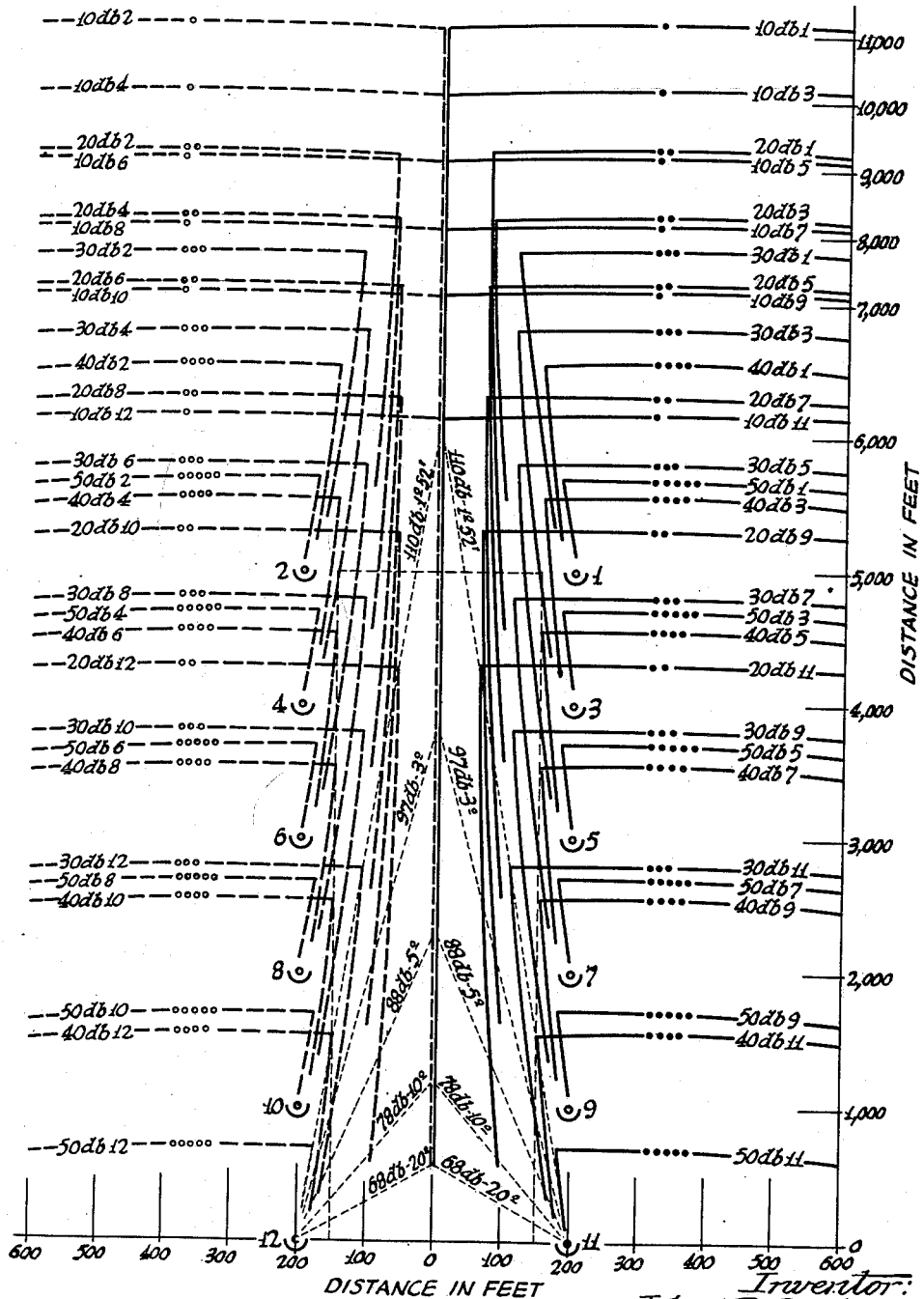
Figs. 10 to 17 are plotted graphs showing the radiation patterns.

Referring first to Fig. 10, the significant portions of the field strength patterns of the various beacons are shown for field strengths of 10, 20, 30, 40 and 50 db, it being understood that the direction of approach of an aircraft is from the top of the sheet. The field strength patterns of the odd numbered beacons on the right-hand side of the runway, as viewed in the illustration, are represented by solid lines, while the field strength patterns of the even numbered beacons on the left-hand side of the runway are represented by dashed lines. Adjacent each field strength pattern, there is an indication of the field strength and the particular beacon. Thus, the designation "10 db1" means that the particular pattern represents a field strength of 10 db from beacon 1. In addition, along each side of the sheet the field strength represented by each pattern is designated by a number of dots, each of which represents 10 db. Thus, one dot designates 10 db, two dots designate 20 db, three dots designate 30 db, and so on. In addition to the field strength pattern lines, Fig. 10 shows a number of radiation intensities, from two of the beacons, at different angles to the central plane to provide the desired uniform field strength along said plane.

Fig. 10 shows the power distribution pattern which establishes a uniform field strength of 10 db along a plane extending centrally of the runway, when the atmosphere has an attenuation of 20 db per 5000 feet. With this condition established, as the aircraft proceeds along the central plane, the receiving antenna receives only signals of 10 db field strength and, therefore, the beacons appear on the viewing screen as clearly defined dots.

Figure 11:
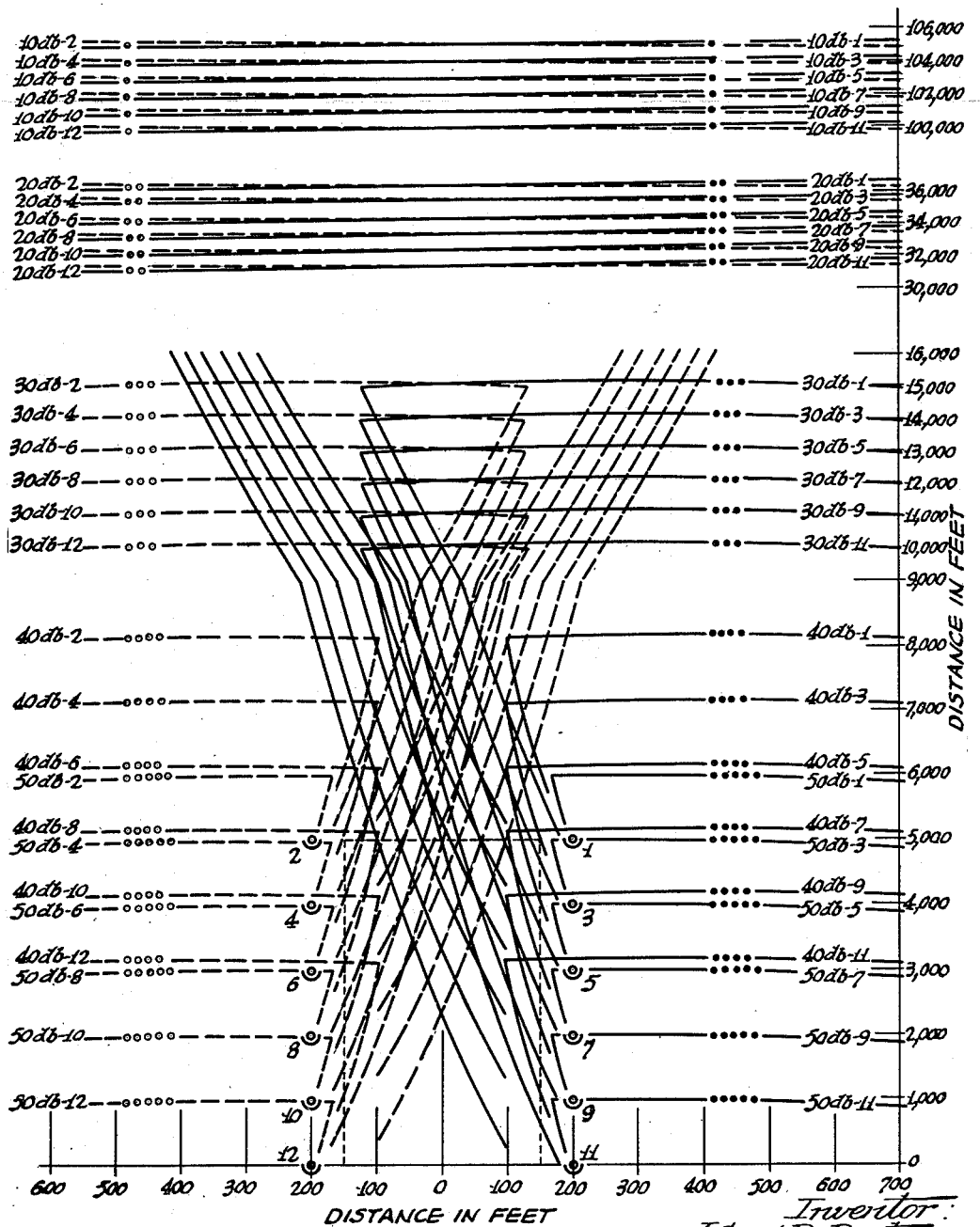

Fig. 11 shows what happens to the same transmission pattern when transmission is through space which has an attenuation of the inverse square of the distance. It will be noted that the condition of uniform field strength along the central plane no longer exists.

Figure 12:
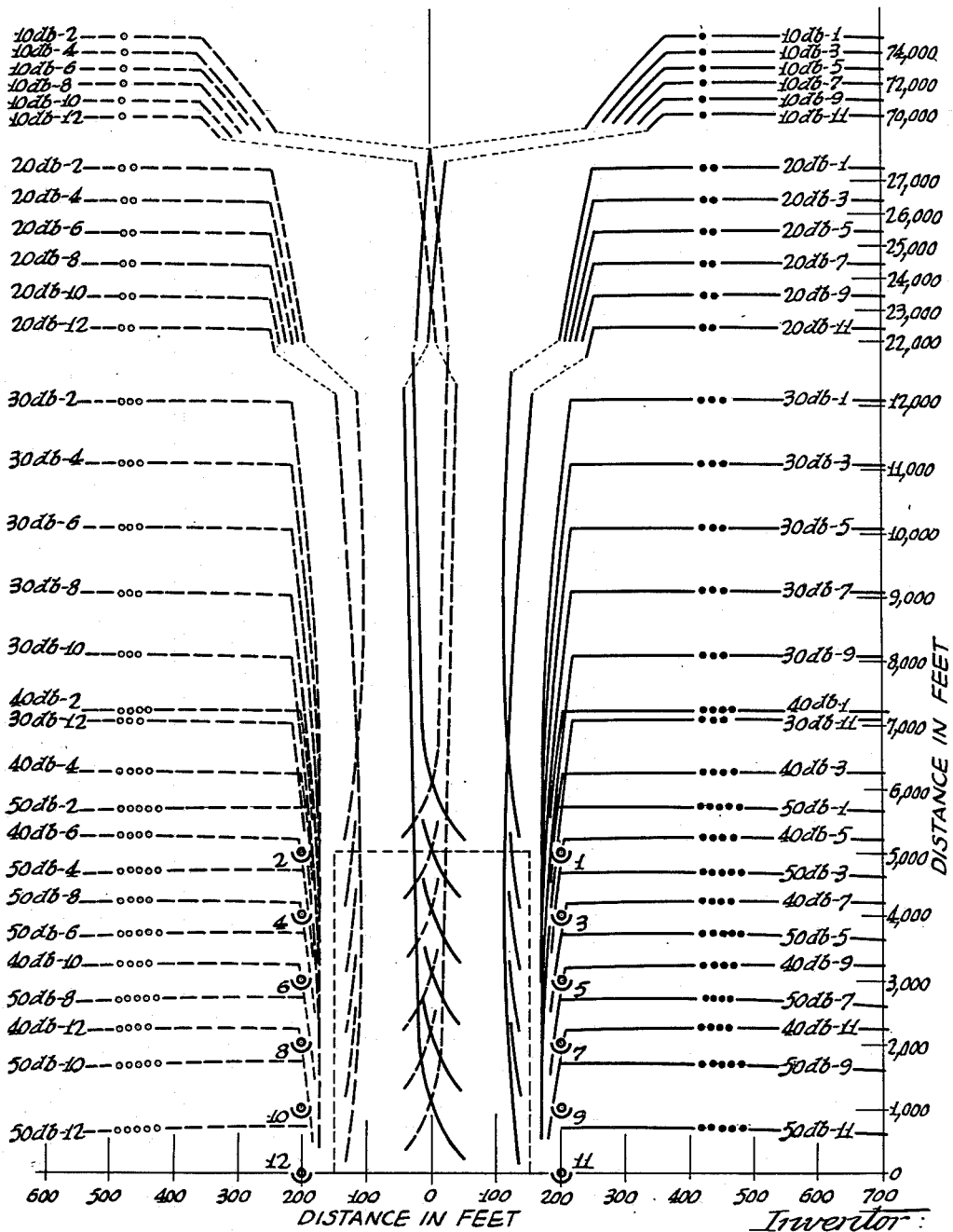

Fig. 12 shows what happens in this instance when the axes of the beams have been moved 2° away from the central plane and the transmitted power has been reduced by a factor of .5. It will be noted that the condition of uniform field strength of 10 db along the central plane has been reestablished.

Figure 13:
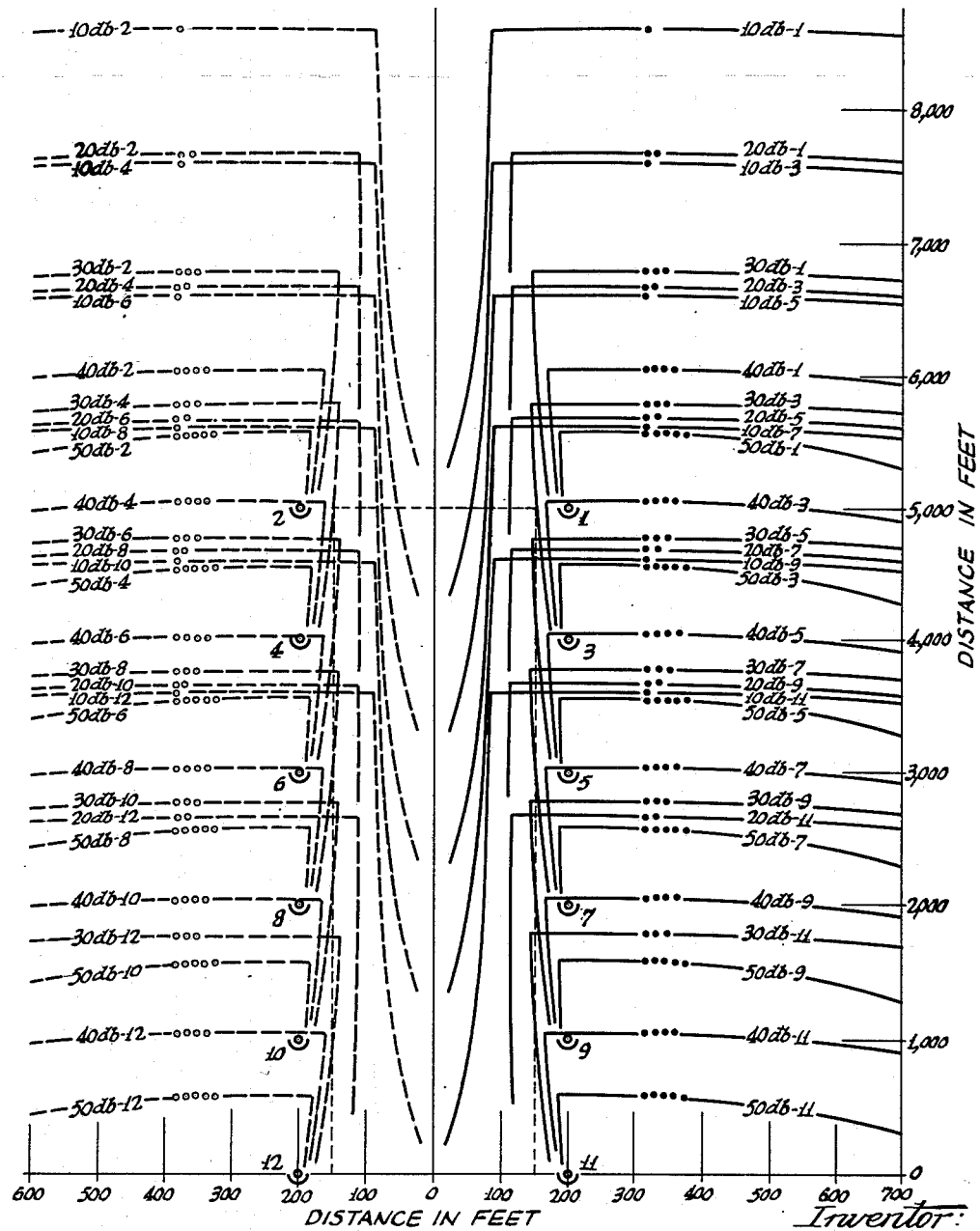

Fig. 13 shows the same transmission pattern as Fig. 10 but where the atmosphere has an attenuation of 40 db per 5000 feet. Here again, the condition of uniform field strength along the central plane no longer exists.

Figure 14:
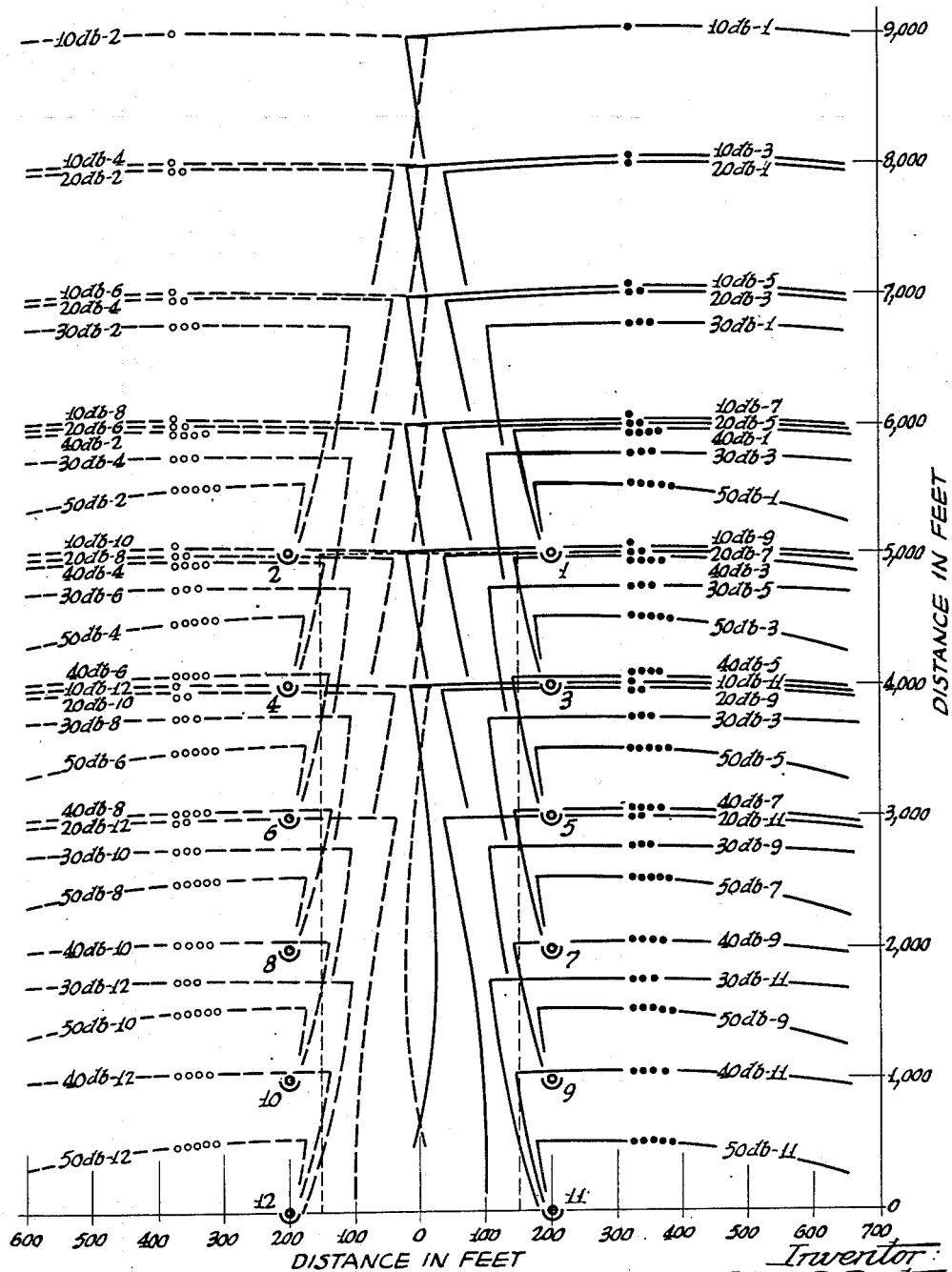

Fig. 14 shows correction from the condition of Fig. 13 effected by shifting the axes of the beam 1° 15′ toward the central plane and by increasing the transmitted power 4 db. It will be noted that a substantially uniform field strength of 10 db along the central plane is again established.

Figure 15:
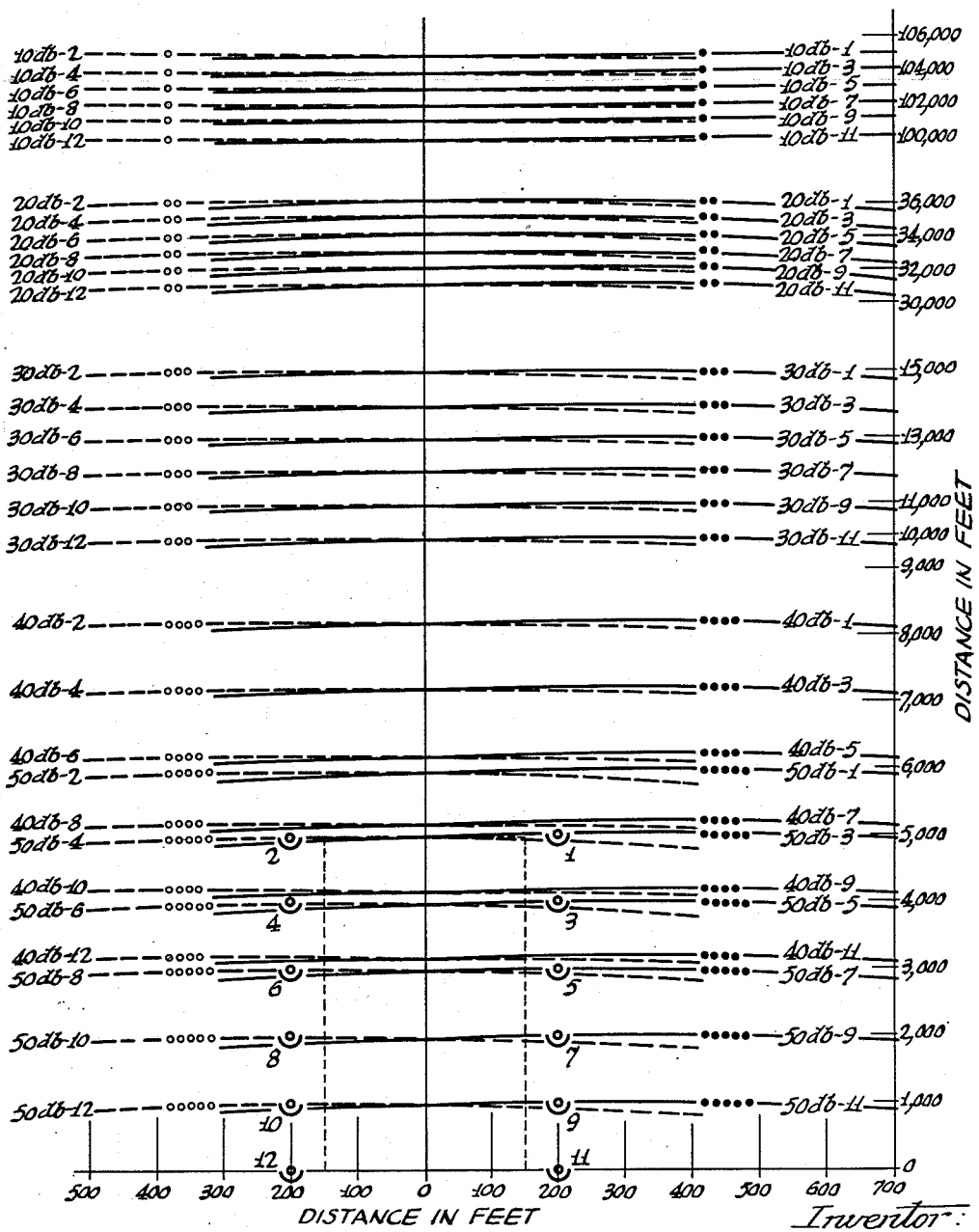
Figure 16:
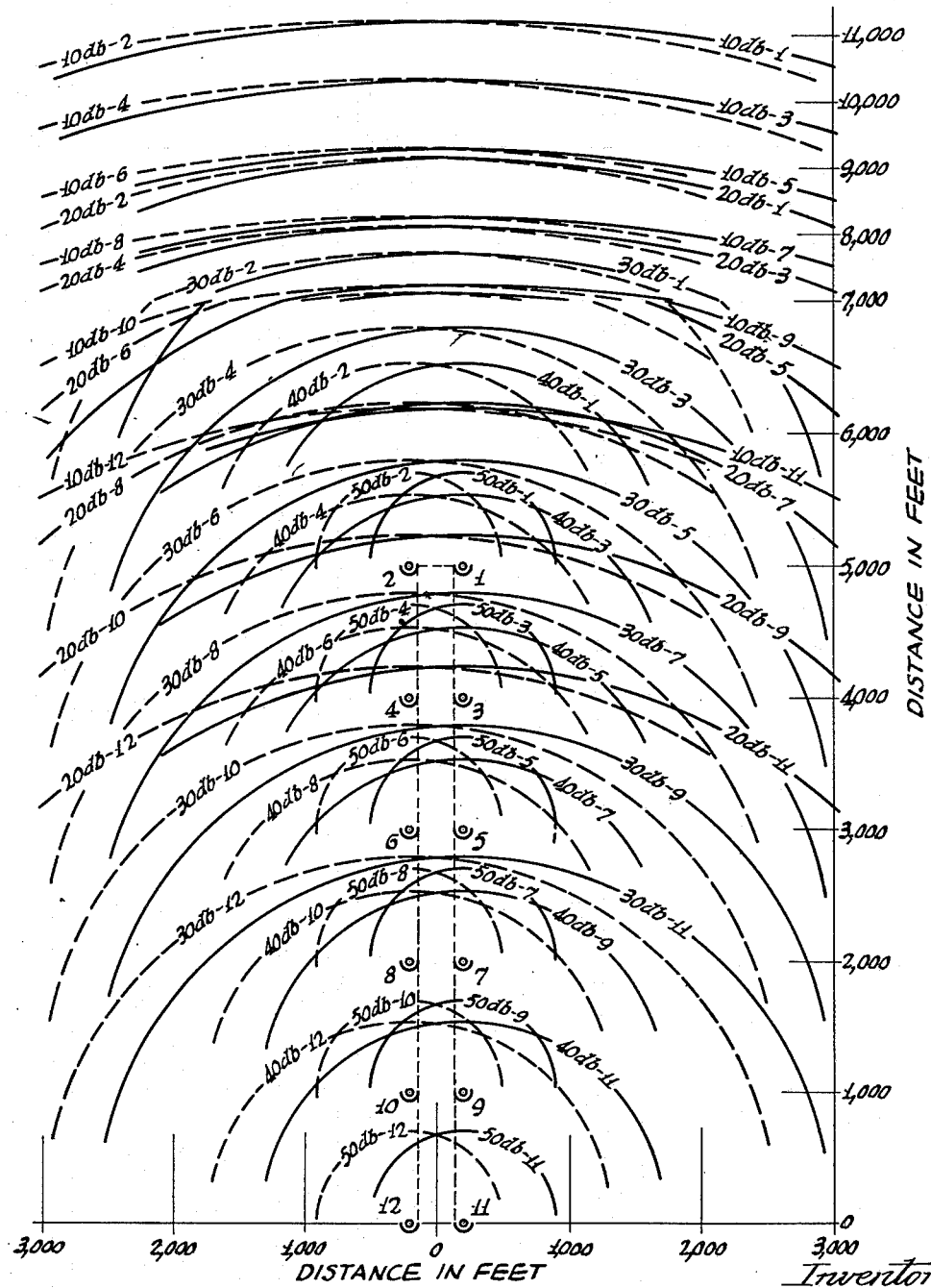
Figure 17:
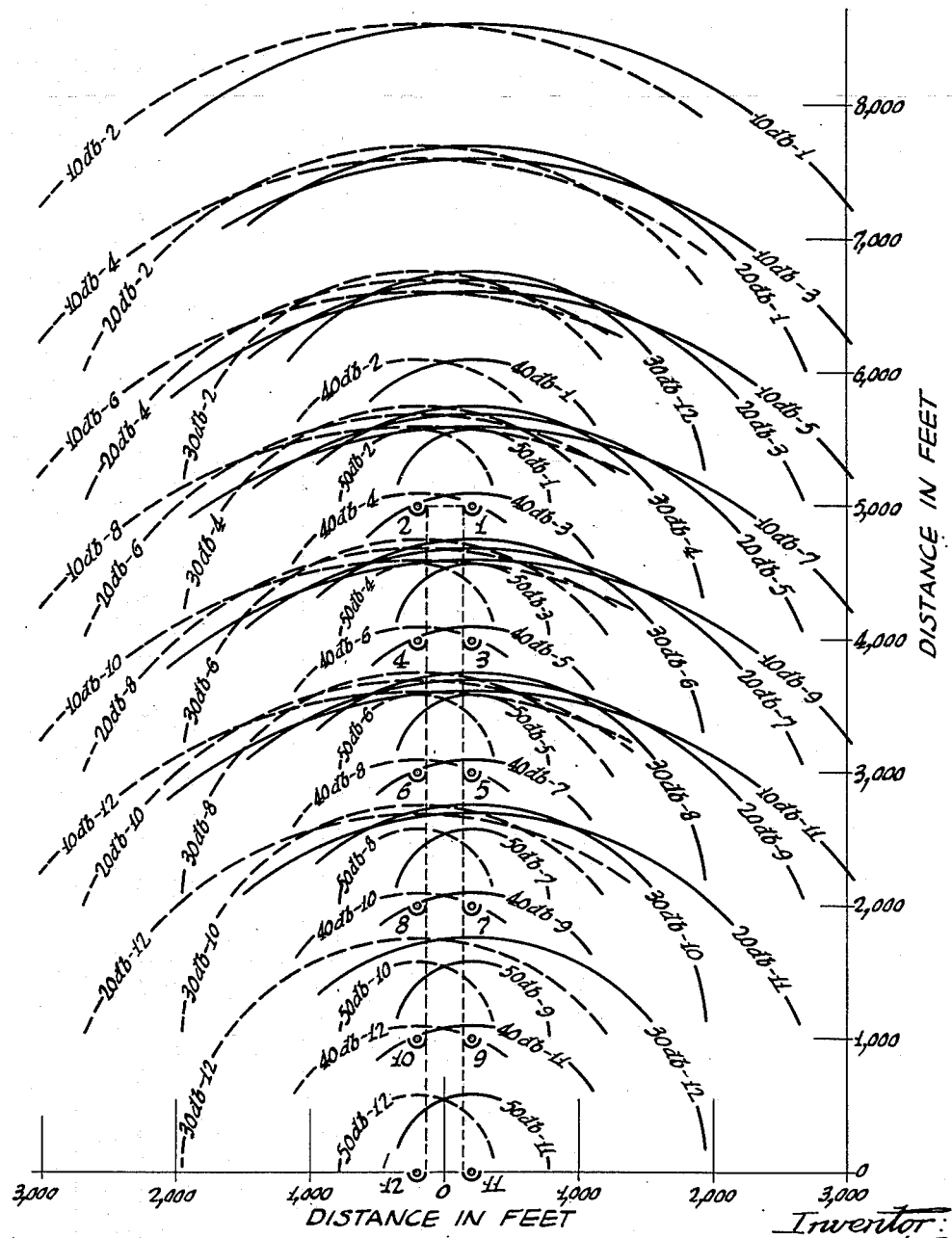

Figs. 15 to 17 show the effects of uncontrolled radiation patterns under the conditions assumed above. Fig. 15 shows the field strength of the patterns from uncontrolled beacons with 110 db omni-directional radiation through space which has an attenuation of the inverse square of the distance. In contrast to Fig. 12, the field strength changes from one value to another along the central plane.

Fig. 16 shows uncontrolled radiation of the same beacons when the atmosphere has an attenuation of 20 db per 5000 feet. In contrast to Fig. 10, the field strength varies along the central plane.

Fig. 17 shows the uncontrolled radiation from the same beacons but when the atmosphere has an attenuation of 40 db per 5000 feet. In contrast to Fig. 14, the field strength varies along the central plane.

It should be noted that conditions such as depicted in Figs. 11, 15, 16 and 17 will actually give rise to such scattering as to preclude defined patterns. Therefore these figures necessarily ignore the scattering effects.

Figs. 18 to 20 illustrate a runway beacon which has provisions for remote adjustment of angularity and intensity of the beam as above described. As shown in Fig. 18, each of the runway beacons may comprise a low power microwave generator 60, such as a klystron, and a suitable beam-forming antenna or radiator as above mentioned. As illustrated, the microwave generator may supply microwave energy to a wave-guide 61 leading to the horn 46. An adjustable matching device 62 is used to provide the proper matching impedance at the generator output probe to effect efficient energy transfer to the wave-guide 61. The microwave generating and radiating combination or unit may be supported by a standard 63 within a closure 64, which may be provided with a plastic cover 65. Angular adjustment, in azimuth, may be effected by means of a synchronous motor and gear drive unit 66, the microwave generating and radiating unit being mounted on a vertical shaft 67 driven by the motor-driving unit. A power supply unit 68 supplies operating current and voltages for the klystron 60 through slip rings 69. All of the angularity adjustment motors of the runway beacons may be remotely operated simultaneously to effect coordinated adjustment of all of the radiated beams at one time. This merely involves connection of the motors to a common circuit extending from a control station or tower, and the provision of a common control switch at said station. A synchronous motor-driven indicator may be connected to said circuit at said station The intensity or strength of each radiated beam may be adjusted by means of an arrangement such as shown more clearly in Figs. 19 and 20. The wave-guide 61 is slotted as at 70, and a tapered wedge 71 is arranged to be adjustably inserted into the wave-guide. This wedge may consist of a plastic member coated with a resistive compound such as graphite and water-glass. In the arrangement shown, the wedge is carried by a support 72 which may move vertically along a guide 73, and the support threadedly engages a rotatable screw 74 which is driven by a synchronous motor 75 through gears 76. The elements just described may be supported by a housing or casing 77 fixedly mounted on the wave-guide.

The slot 70 in the wave-guide does not materially affect the efficiency thereof. As the wedge 71 is variously inserted into the wave-guide, it absorbs some of the energy therein and thus varies the energy which is supplied to the horn radiator 46. All of the intensity-varying motors may be connected to a common circuit extending from the control tower and having a control switch. A synchronous motor-driven indicator may be provided at the tower. Thus the intensit of all of the projected beams may be varied si multaneously.

Figure 21:
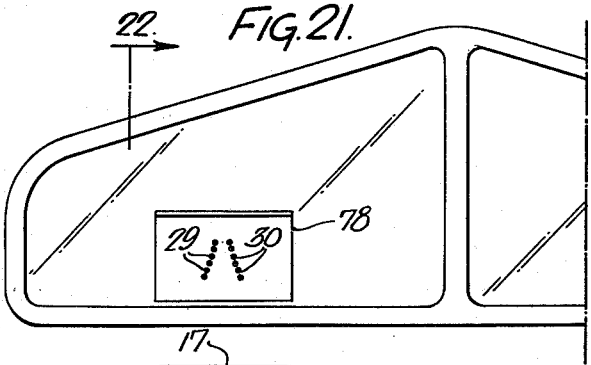
Fig. 21 is a elevational view showing the preferred viewing arrangement employed on the aircraft.

It will be apparent from the foregoing descrip tion that in a system of this character, the place ment of the indicator screen on the aircraft an representation of the signals on the screen ai important factors. As shown in Figs. 21 and 2: the oscilloscope 16 may be mounted vertically be hind the instrument panel with its screen en up, and the screen made visible by means of transparent reflector 78 arranged at an angle s that the image of the screen will appear to th pilot's eye 79 as though it were in front of th aircraft coming through the windshield 80. In system provided with both microwave beacor and light beacons, this arrangement will perm the pilot to use the microwave beacons as long a the light beacons are invisible. When the ligl beacons break through it will provide two refei ence systems. The appearance of the presenta tion in front of the aircraft windshield aids th pilot in responding automatically to the receive signals. In some instances the windshield itse may serve as a reflector.

Figure 23:
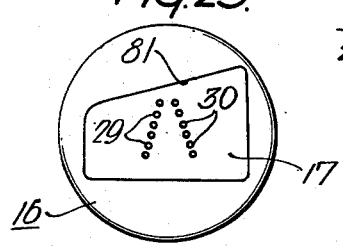
Fig. 23 shows an alternative viewing arrangement.

In some instances, it may be desired to provic for direct viewing of the oscilloscope screen, an in that case the screen may be provided with mask 81, as shown in Fig. 23, which simulates th windshield 80 of the aircraft. Then it will ap pear to the pilot that he is seeing the beaco representations through the windshield.

The system of navigation provided by this ir vention has the pronounced advantages over an previous system employing invisible radiant er ergy that, (1) the information is made availab: to the pilot in a form which is instinctively a: similable by him; (2) the system is capable of degree of resolution under conditions of limite visibility heretofore obtainable only through th employment of much larger wave lengths wit the accompanying prohibitive disadvantages ( large sizes and great weight; (3) as compare with systems employing wave lengths of the sam order the system of my invention is free fror difficulties due to scattering and receiver block ing which have heretofore rendered such wav lengths unusable; (4) as compared with the pric optical system to which reference was above mac the system of the present invention extends th range and hence the length of time before actu: landing during which the pilot may observe an control the aircraft accordingly.

While I have illustrated the invention as em bodied in an airport approach and landing sys tem, it should be understood that the inventio is not limited thereto but is also applicable t the marking of paths of navigation in gener: including, for example, the marking of an airwa between airports. In some instances, it may I desired to provide some back radiation and/c flashing of the forward radiation from th beacons. As shown in Figs. 18 and 19, back radi: tion may be provided by means of a probe 82 an a reflector 83. Flashing of the forward radiatio may be effected by providing a rotatable vane { and a motor 85. Of course, these are option: provisions according to the use to which the sy: tem is applied.

I claim:

1. Flight path marking apparatus for guidir receiver-equipped aircraft, comprising: a pair ( parallel rows of ground beacon units; means i each beacon unit for producing invisible radiar energy of a wave length shorter than 10 cn which energy, upon radiation thereof, is subject to scattering by reflective or diffusive particles in the atmosphere; means in each beacon unit for radiating and beaming the energy therefrom in a predetermined radiation pattern in which the beam portions radiated in different directions toward a vertical flight plane substantially equidistant from the two rows of beacon units are of different intensities to establish in said vertical plane substantially uniform field strength of the direct radiated energy, whereby the strength, in said plane, of scattered energy is caused to be below the field strength therein of direct energy from each beacon unit, and the receiver on an aircraft proceeding along said plane is enabled to discern the beacon units despite the presence of the aforementioned particles in the atmosphere; means in each beacon unit for varying the angularity of the beamed energy relative to said plane according to different conditions of atmospheric attenuation; and means in each beacon unit for varying the intensity of the beamed energy according to different conditions of atmospheric attenuation.

5. Apparatus according to claim 4, wherein each beacon unit includes a rotatable energy generator and radiator assembly, and means for rotating said assembly to vary the angularity of the beamed energy.

6. Apparatus according to claim 5, wherein said rotatable assembly includes a wave guide connected between the energy generator and the radiator, an energy-absorbing element adjustably projectable into the wave guide to vary the intensity of the beamed energy, and means for actuating said element.

7. A ground installation for enabling contact landing of receiver-equipped aircraft on a runway under conditions of poor visbility, comprising: a pair of parallel rows of beacon units on opposite sides of the runway; means in each beacon unit for producing invisible radiant energy of a wave length shorter than 10 cm., which energy, upon radiation thereof, is subject to scattering by reflective or diffusive particles in the atmosphere; and means in each beacon unit for radiating and beaming the energy therefrom in a predetermined radiation pattern in which the beam portions radiated in different directions toward a vertical aproach plane extending centrally of the runway are of different intensities to establish in said vertical plane substantially uniform field strength of the direct radiated energy, whereby the strength, in said plane, of scattered energy is caused to be below the field strength therein of direct energy from each beacon unit, and the receiver on an aircraft proceeding along said plane is enabled to discern the beacon units despite the presence of the aforementioned particles in the atmosphere.

8. A ground installation for enabling contact landing of receiver-equipped aircraft on a runway under conditions of poor visibility; comprising: a pair of parallel rows of beacon units on opposite sides of the runway; means in each beacon unit for producing invisible radiant energy of a wave length shorter than 10 cm., which energy, upon radiation thereof, is subject to scattering by reflective or diffusive particles in the atmosphere; means in each beacon unit for radiating and beaming the energy therefrom in a predetermined radiation pattern in which the beam portions radiated in different directions toward a vertical approach plane extending centrally of the runway are of different intensities to establish in said vertical plane substantially uniform field strength of the direct radiated energy, whereby the strength, in said plane, of scattered energy is caused to be below the field strength therein of direct energy from each beacon unit, and the receiver on an aircraft proceeding along said plane is enabled to discern the beacon units despite the presence of the aforementioned particles in the atmosphere; and means in each beacon unit for varying the angularity of the beamed energy relative to said plane according to different conditions of atmospheric attenuation.

9. A ground installation for enabling contact landing of receiver-equipped aircraft on a runway under conditions of poor visibility, comprising: a pair of parallel rows of beacon units on opposite sides of the runway; means in each beacon unit for producing invisible radiant energy of a wave length shorter than 10 cm., which energy, upon radiation thereof, is subject to scattering by reflective or diffusive particles in the atmosphere; means in each beacon unit for radiating and beaming the energy therefrom in a predetermined radiation pattern in which the beam portions radiated in different directions toward a vertical approach plane extending centrally of the runway are of different intensities to establish in said vertical plane substantially uniform field strength of the direct radiated energy, whereby the strength, in said plane, of scattered energy is caused to be below the field strength therein of direct energy from each beacon unit, and the receiver on an aircraft proceeding along said plane is enabled to discern the beacon units despite the presence of the aforementioned particles in the atmosphere; and means in each beacon unit for varying the intensity of the beamed energy according to different conditions of atmospheric attenuation.

10. A ground installation for enabling contact landing of receiver-equipped aircraft on a runway under conditions of poor visibility, comprising: a pair of parallel rows of beacon units on opposite sides of the runway; means in each beacon unit for producing invisible radiant energy of a wave length shorter than 10 cm., which energy, upon radiation thereof, is subject to scattering by reflective or diffusive particles in the atmosphere; means in each beacon unit for radiating and beaming the energy therefrom in a predetermined radiation pattern in which the beam portions radiated in different directions toward vertical approach plane extending centrally of the runway are of different intensities to establish in said vertical plane substantially uniform field strength of the direct radiated energy, whereby the strength, in said plane, of scattered energy is caused to be below the field strength therein of direct energy from each beacon unit, and the receiver on an aircraft proceeding along said plane is enabled to discern the beacon units despite the presence of the aforementioned particles in the atmosphere; means in each beacon unit for varying the angularity of the beamed energy relative to said plane according to different conditions of atmospheric attenuation; and means in each beacon unit for varying the intensity of the beamed energy according to different conditions of atmospheric attenuation.

11. Apparatus according to claim 10, wherein each beacon unit includes a rotatable energy generator and radiator assembly, and means for rotating said assembly to vary the angularity of the beamed energy.

12. Apparatus according to claim 11, wherein said rotatable assembly includes a wave guide connected between the energy generator and the radiator, an energy-absorbing element adjustably projectable into the wave guide to vary the intensity of the beamed energy, and means for actuating said element.

JOHN B. BARTOW.

References Cited in the file of this patent

UNITED STATES PATENTS

| Number | Name | Date |
|---|---|---|
| 2,280,126 | Metcalf | Apr. 21, 19— |
| 2,427,686 | Muller | Sept. 23, 19— |
| 2,463,095 | Wight | Mar. 1, 19— |
| 2,539,405 | Deloraine | Jan. 30, 19— |